Oct. 9, 1956 R. W. HAEGELE 2,765,516
SEMICONDUCTOR TRANSLATORS
Filed Oct. 20, 1951
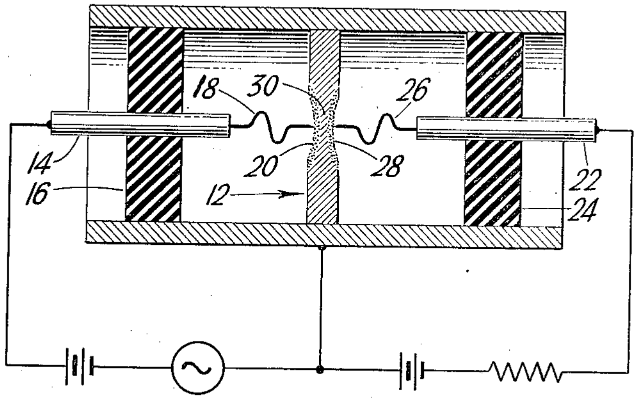
INVENTOR
ROWLAND W. HAEGELE
BY Paul S. Martin
ATTORNEY

United States Patent Office 2,765,516
Patented Oct. 9, 1956

2,765,516

SEMICONDUCTOR TRANSLATORS

Rowland W. Haegele, San Mateo, Calif., assignor to Sylvania Electric Products Inc., a corporation of Massachusetts Application October 20, 1951, Serial No. 252,215

2 Claims. (Cl. 29—25.3)

The present invention relates to translators and especially to electrical amplifiers employing at least three terminal connections engaging a body of a semiconductor.

The material used heretofore in one effective type of device of this class is crystalline germanium, carefully processed to impart the proper type of semiconductor characteristic, either N-type or P-type. In this type of translator, a pair of point contact elements engages a part of the germanium at points very close together, separated by a few thousandths of an inch, and a third contact of large area also engages the germanium.

A second type of translator of this class includes a stratum of one type of semiconductor sandwiched between semiconductor portions of the other type. The first class may be termed "point contact transistors" and the second may be called "area junction transistors." The present invention represents an improvement in transistors and is effective as an improvement in either or both of the above classes.

An object of the present invention is to improve methods of making semiconductor transistors, more particularly crystalline germanium transistors, and to improve transistors as such.

Transistors are known in which a thin specimen of germanium as a semiconductor is engaged by an area contact and is additionally engaged on opposite sides by a pair of sharp contacts in a region where the thinness of the germanium is such that the sharp contacts produce interaction in the bulk of the germanium. Such arrangement of contacts is disclosed and claimed in copending application, Serial No. 41,785, filed July 31, 1948, by Harold Heins, and now abandoned. A more specific object of the present invention is to improve transistors of this "bulk-interaction" type.

Area junction transistors have also been proposed in which a thin layer of semiconductor of one type is sandwiched between portions of semiconductor of the opposite type and suitable circuit connections are provided for producing interaction in the thin center layer. Methods of producing such thin layer are considered complicated and delicate, and involve considerable waste in that the bulk of a carefully prepared germanium ingot containing the thin stratum of one type of germanium between larger volumes of the other type must be sawed out of the ingot and much of the ingot discarded. A feature of the present invention is to provide a method of vastly improved ease and efficiency for producing area junction translators.

In broad aspect, a semiconductor, especially germanium, of largely homogeneous semiconductor type is subdivided as with a diamond wheel to provide a thin slab or a thin small specimen, and opposite surfaces of such thin specimen are surface-treated for converting it to a three-level semiconductor in one integral body whose surface strata are of one type of (converted) semiconductor and whose center stratum is of the opposite (original) type of semiconductor. Viewed otherwise, the form of the semiconductor element is fixed first and the surface layers are then converted to the proper type of semiconductor instead of producing strata in a much larger ingot and later locating and subdividing the three-strata portion from the ingot as is a known practice of producing area-junction translators.

Surface treatments for effecting a change of semi-conductor property, apart from transistors, are fairly well known in the art. Thus, it is known that one surface of a body of semiconductor of one type can be exposed to a material suitable for doping the semiconductor in a way to impart the opposite type of semiconductor characteristic. A body of germanium of N-type characteristic can be treated to convert a surface portion thereof for a limited depth to P-type characteristic, as by hot surface diffusion with an acceptor metal, especially group IV–B of the periodic chart of the atoms. Conversely, P-type germanium can be treated to convert a surface for a limited depth to N-type-characteristic by heated exposure to donor atoms, either metal or gas. Alternatively, the surface and a limited depth of a germanium specimen of one type can be leached of its impurities by means of a metallic etch, for example so as to convert an N-type homogeneous specimen of germanium to one having a layer of P-type germanium. The details of one such treatment are disclosed in copending application Serial No. 214,969, filed March 10, 1951, by Rothlein and Stahl. In that pending application there is disclosed a process wherein zinc pellets are used to impart various types of photosensitivity to N-type germanium, for example, the zinc pellets being deposited on the germanium surface and subjected to a heat treatment actually producing a crater in the germanium after cooling and chemical etching and leaving a P-type surface.

An area junction translator is produced in the present invention by subjecting opposite faces of a thin specimen of germanium to a surface treatment appropriate to convert a layer on each side from the original type of semiconductor to the opposite type, with the result that the original unchanged semiconductor remains as a layer of reduced thickness sandwiched between converted layers of the changed semiconductor, all the layers remaining integrally united.

The following detailed disclosure of an illustrative embodiment will promote further understanding of the invention, reference being made therein to the accompanying drawing. From this specific description further objects and features of novelty will be apparent.

The drawing is a greatly enlarged longitudinal cross-section of an illustrative translator embodying features of the invention. In this drawing a metal tube 10 constitutes a case of the device and engages a body 12 of the crystalline germanium as the semiconductor in a contact of large area about the periphery of that body. A wire or lead 14, supporting in insulating block 16, carries a sharp-ended contact 18 in resilient engagement with a surface portion 20 of body 12. Similarly, wire or lead 22 in insulating block 24 carries a sharp contact 26 in resilient engagement with surface portion 28 of body 12. Between portions 20 and 28 (each very thin) is a stratum or layer 30 of limited thickness, of the order of a few thousandths of an inch, of a different type of semiconductor than that of the outer layers 20 and 28. Portion 30 is of the same semiconductor type as that of the bulk of body 12. Engagement of contacts 18 and 26 with layers 20 and 28 is desirably ohmic.

Body 12 is formed advantageously by grinding shallow depressions in opposite surfaces of a thin specimen of N-type germanium, depositing zinc in these depressions and subjecting the zinc to prolonged heat treatment in a vacuum furnace at 600 to 800° C. as described in said copending application Serial No. 214,969, filed March 10, 1951, by Rothlein and Stahl. This treatment has the effect of changing the nature of the semiconductor for a limited depth to P-type. As a result, an integral assembly of three layers or strata of semiconductor is obtained, the outer two of which are both P-type and which differ from the central (N-type) stratum. The transistor action is produced between the outer strata and the central stratum, and not at the engagement of contacts 18 and 26 with body 12; in consequence of which it is feasible to substitute contacts of substantial area in place of the sharp contacts 18 and 26 illustrated. As a further alternative readily apparent to those skilled in the art, the germanium body may readily be formed with a region sufficiently thin for the purpose described by employing a wedge form of body, rather than the dished body shown. In any method used, the surface-treated germanium should initially be no greater in thickness than the desired thickness of the central stratum plus twice the depth of penetration of the treatment employed.

The term "metal etch" has been used to identify the technique of engaging the germanium with a metal of lower melting temperature than the germanium and which is relatively insoluble in germanium, and heating the assembled germanium and etching metal to a point below the melting temperature of the germanium to abstract impurities from the germanium by forming alloys of such impurities in the applied etching metal. This action is accomplished with zinc as in the copending application of Rothlein and Stahl, mentioned above, the zinc being originally present as a pellet or a heavy plating, being found later to have substantial concentration of (or be replaced by) various impurities removed from the germanium body. Silver can be used to effect similar results.

A latitude of alternatives and varied application of the invention will occur to those skilled in the art and it is accordingly appropriate that the appended claims be allowed that broad interpretation that is consistent with the spirit and scope of the invention.

What I claim is:

1. The method of making a semiconductor translator having three terminal connections respectively engaging a body of crystalline germanium having a central stratum of one semiconductor type between two additional strata of the opposite semiconductor type, which includes the steps of forming a body of homogeneous germanium with a thin region whose thickness is not substantially greater than the desired thickness of the center stratum, converting substantial areas of the opposite surfaces of said thin region to the opposite semiconductor type without changing the semiconductor characteristic of the center stratum by treating the opposite surfaces with a metallic etchant, and then engaging the converted strata with ohmic contacts.

2. The method of making a semiconductor translator including a body of crystalline germanium having a center stratum of one semiconductor type between additional strata of the opposite semiconductor type, which includes the steps of forming a homogeneous body of one semiconductor type with a thin region of slightly greater thickness than the desired thickness of the center stratum, subjecting the opposite surfaces of said thin region to a metallic etch and engaging the etched surfaces with ohmic contacts.

References Cited in the file of this patent

UNITED STATES PATENTS

| | | |
|---|---|---|
| 2,563,503 | Wallace | Aug. 7, 1951 |
| 2,654,059 | Shockley | Sept. 29, 1953 |
| 2,666,814 | Shockley | Jan. 19, 1954 |
| 2,691,750 | Shive | Oct. 12, 1954 |